Sept. 12, 1939.  H. SCHWARTZ  2,172,457
CONTAINER
Filed March 15, 1937
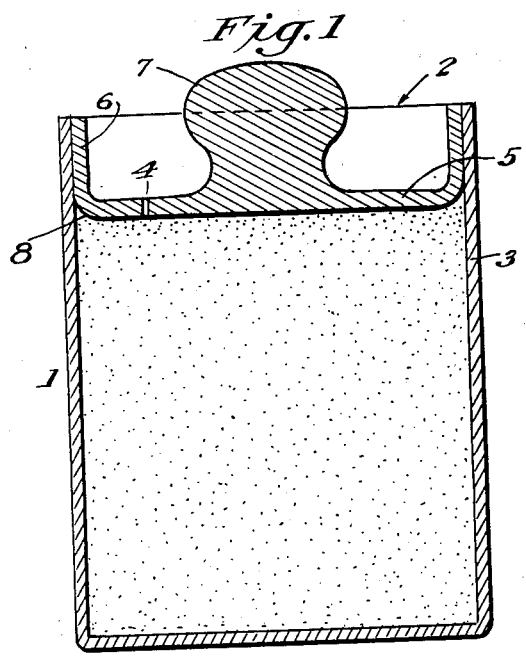
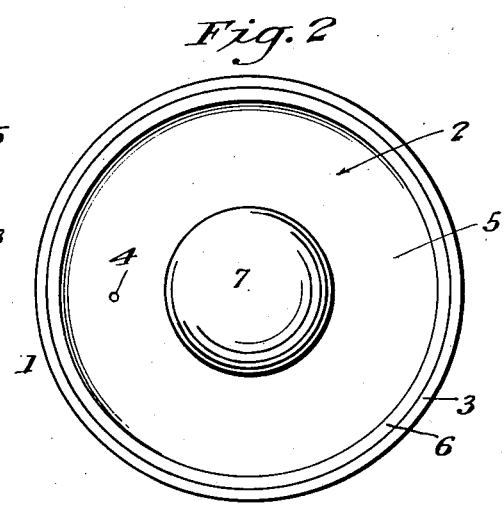
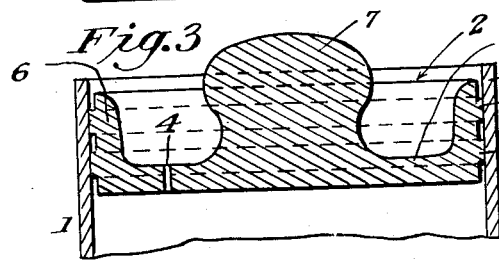
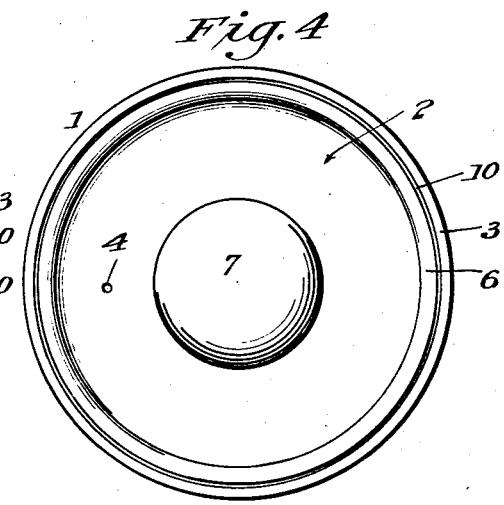
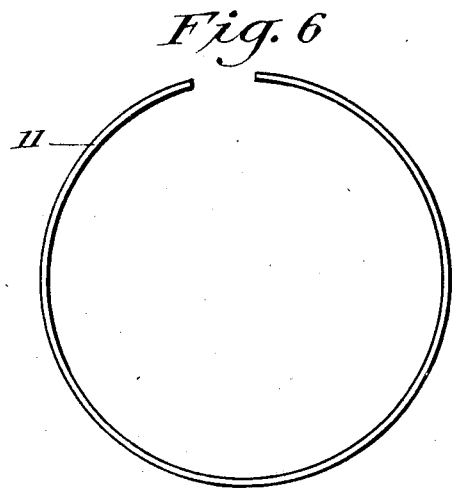
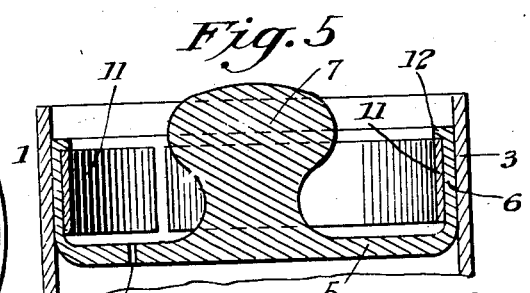
INVENTOR:
Hyman Schwartz,
BY Alan Franklin
ATTORNEY.

Patented Sept. 12, 1939

2,172,457

UNITED STATES PATENT OFFICE 2,172,457

CONTAINER

Hyman Schwartz, Los Angeles, Calif.

Application March 15, 1937, Serial No. 130,928

1 Claim. (Cl. 220—93)

This invention relates to dispensing containers, for dry articles, such as tobacco, coffee, sugar, cereals and the like.

The general object of the invention is to provide an inexpensive dispensing container with a floating cover which is closely fitted for air-tight sliding contact with the inner surface of the side wall of the container receptacle and is provided with an air vent, so that said cover may be readily removed from the container receptacle for dispensing the contents thereof, or moved down to any position within said receptacle upon the contents and the air expelled from said receptacle through said air vent, to maintain said receptacle air tight and prevent spoiling of said contents.

A particular object is to provide a container of the character stated which may be made of pulp or plastic materials, such as compressed paper, fibre, cellulose, and the like, and may be thrown away after the contents thereof have been dispensed therefrom.

Other objects and advantages will appear hereinafter.

The invention is illustrated in the annexed drawing which forms a part of this specification and in which:

Fig. 1 is a transverse vertical section of my container.

Fig. 2 is a plan view of my container.

Fig. 3 is a transverse vertical section of a modification of the cover of my container.

Fig. 4 is a plan view of Fig. 3.

Fig. 5 is a transverse vertical section of another modification of the cover of my container.

Fig. 6 is a plan view of the expansion ring of the cover shown in Fig. 5.

Referring more particularly to the drawing, in which corresponding parts are designated by the same reference characters in all of the figures, my container comprises primarily a receptacle 1 and a cover 2 fitted for slidable air-tight contact with the inner surface of the side wall 3 of said receptacle, which cover is provided with an air vent 4. The cover 2 is formed with a bottom wall 5, an annular side wall 6, upstanding from said bottom wall, and a handle in the form of a knob 7 upstanding from the center of said bottom wall 5, the lower corner 8 of said cover being rounded off so that the lower side of the cover may be readily introduced into the top of the receptacle 1. The receptacle 1 and the cover 2 are made of pulp or plastic material, such as compressed paper, fiber, cellulose or the like, which provides a slightly resilient receptacle to expand slightly when the cover 2 is introduced into the receptacle, the outer diameter of the annular side wall 6 of the cover being of substantially the same or slightly larger diameter than the inner diameter of the side wall 3 of the receptacle whereby the cover is fitted to air-tight sliding contact with the inner surface of said side wall of the receptacle.

The operation, uses and advantages of my invention are as follows:

The cover 2 being withdrawn from the receptacle 1 through its upper end, any suitable dry article, such as tobacco, coffee, sugar, cereal or the like, is placed in said receptacle and the cover 2 is introduced into the upper end of the receptacle and pressed downwardly therein until the bottom wall 5 of the cover is brought against the level of the contents of the receptacle, the air in the upper part of the receptacle escaping through the vent 4 in the cover 2, and the close contact of the side wall 6 of the cover with the inner surface of the side wall 3 of the receptacle, shutting out the entrance of air into the receptacle to the contents of the receptacle so that said contents will not be spoiled by air.

To remove a quantity of the contents of the receptacle 1, the knob 7 of the cover 2 is grasped by one's hand and the cover withdrawn from the receptacle through the upper end thereof. After removing a quantity of the contents from the receptable, the cover, being grasped by its knob 7, is again introduced into the top of the receptacle and pressed downwardly therein until its bottom wall 5 is brought against the lowered level of the contents in the receptacle, the air escaping from the receptacle through the vent 4, and atmospheric air being shut out from the receptacle by the airtight fit of the side wall 6 of the cover with the inner surface of the side wall 3 of the receptacle as aforesaid. Quantities of the contents of the receptacle may be removed from time to time and the receptacle closed by the cover after removal of each quantity, as aforesaid, until all of the contents of the receptacle are removed therefrom. The container, which may be produced at negligible cost, may be thrown away when the contents are removed therefrom.

In the modification of the cover shown in Figs. 3 and 4 the side wall 6 of the cover 2 is formed with external annular ribs 10 which are adapted to fit the inner surface of the side wall 3 of the receptacle 1 in air-tight sliding contact therewith.

In the modification of the cover, shown in Figs. 5 and 6, the walls of the cover are made thin and a split expansion ring 11 is placed within the cover and sprung against the inner side of the side wall 6 of the cover for expanding said side wall and maintaining the outer surface of said side wall in air-tight sliding contact with the inner surface of the side wall 3 of the receptacle 1. The side wall 6 of the cover 2 is formed at its upper edge with an internal flange 12 which extends over the upper edge of the ring 11 for maintaining said ring in position within the cover.

While it is preferable to make the receptacle 1 of resilient material to expand under the wedging action of the cover 2 when inserted therein in order to make an air tight fit between the cover and the receptacle, the receptacle may be made of nonresilient material, such as glass, metal or the like, and the cover made of resilient material, such as compressed paper, cellulose or the like, so that the cover will contract when wedged into the receptacle, and form an air tight fit with the receptacle.

While the fit between the cover and the receptacle is normally an air-tight fit, a substantially air-tight fit between the cover and the receptacle would be practically sufficient, and my invention therefore contemplates a substantially air-tight fit between the cover and the receptacle.

In this specification I have illustrated my invention in the form which I consider desirable, but I do not limit my invention to such form, because it may be embodied in other forms, and it is to be understood that in and by the claim of this specification I intend to cover my invention in whatever form it may be embodied.

I claim:

In a storage container having side and bottom walls to form an open top chamber, a cover element having a flexible flange about its periphery and adapted to snugly fit the chamber, spaced apart annular ribs integral with the flange and extending therefrom into contact with the side walls to make an air tight seal therewith, the flexible flange having sufficient resiliency to continually hold the ribs in contact with the side walls of the chamber.

HYMAN SCHWARTZ.